United States Patent Office 2,972,642
Patented Feb. 21, 1961

2,972,642

PROCESS FOR ALKYLATING HYDROCARBONS

William C. Pfefferle, Florham Park, and Paul N. Rylander, Newark, N.J., assignors, by mesne assignments, to Engelhard Industries, Inc., Newark, N.J., a corporation of Delaware No Drawing. Filed May 15, 1958, Ser. No. 735,388

14 Claims. (Cl. 260—671)

Our invention relates to the alkylation of hydrocarbons.

The alkylation of hydrocarbons is a type of operation which is widely practiced in the art. For example, alkylate which is a highly useful motor fuel ingredient is manufactured on a large scale by reacting suitable isoparaffins such as isobutane with suitable olefins such as a butene. Also, ethyl benzene is prepared on a large scale by reacting benzene and ethylene, the ethyl benzene being subsequently dehydrogenated to form styrene for use in the manufacture of synthetic rubber. It has been heretofore proposed to alkylate isoparaffin and aromatic hydrocarbons with olefins using as a catalyst associations of refractory metal oxides such as alumina, silica, magnesia, thoria, boria, zirconia, and the like. One would expect the use of such catalysts to be advantageous, in that being solids they would be readily separable from the alkylation products. The practical art has not turned to the use of such catalysts, however, but instead has turned to the use of sulfuric acid, hydrogen fluoride or aluminum chloride. Sulfuric acid, hydrogen fluoride and aluminum chloride are highly acidic materials and hence give rise to corrosion and other difficulties. The disposal of spent alkylation sulfuric acid represents a serious problem. There is a need in the art, therefore, for an alkylation process involving the use of a solid catalyst which does not have an acidic element substantially soluble in the product, since the use of such a catalyst would obviate the corrosion difficulties encountered with sulfuric acid, hydrogen fluoride and aluminum chloride and would also provide a process in which separation of the catalyst from the alkylation products produced would be extremely simple.

In accordance with our invention, we have discovered that catalysts which are highly effective for the alkylation of aromatic and isoparaffin hydrocarbons with monoolefin hydrocarbons can be prepared by supporting one or more refractory metal oxides other than alumina on a particular type of alumina base, generally in amount ranging from 1 percent to 20 percent by weight or somewhat more, based upon the weight of the catalyst composition. Among the refractory metal oxides which can be supported on the alumina base are silica, magnesia, thoria, boria, zirconia, or mixtures thereof. Alumina bases employed in accordance with this invention can be prepared as described in Keith and Hauel application Serial No. 498,084, filed March 30, 1955, now United States Patent No. 2,867,588, and Teter, Gring and Keith application Serial No. 716,831, filed February 5, 1958, now United States Patent No. 2,838,375, which describe bases prepared by the drying and calcination of a mixture of precursor hydrous alumina phases containing at least 65 percent of trihydrate. Other alumina bases can be prepared by intimately admixing aluminum trihydrate and a suitable mixture of the precursor hydrous alumina phases of Serial No. 498,084 and Serial No. 716,831 and thereafter drying and calcining the mixture. The base employed in accordance with our invention thus essentially comprises calcined alumina which is characterized by a large pore, high area structure essentially composed of gamma alumina modifications resulting from the drying and calcination of a mixture of precursor hydrous alumina phases containing at least about 65 percent of trihydrate. The base, after calcining and before use, has an area (BET method) of from about 350 to about 550 square meters per gram.

The use of these catalysts in the alkylation of aromatic or isoparaffin hydrocarbons with monoolefin hydrocarbons presents various advantages. Thus, the catalysts are of long life. Moreover, caustic treatment of the alkylation products is not required, and they are of excellent color and are heat stable. Also, the catalysts operate effectively under a wide range of reaction conditions, and they present no acid sludge disposal problem.

In use, the catalysts can be employed in the alkylation reaction according to the conditions which have heretofore been suggested in the art for the alkylation of aromatic and isoparaffin hydrocarbons with monoolefin hydrocarbons. Thus, the temperature employed will generally be within the range from about 250° F. to about 650° F. and the pressure used will generally be from atmospheric up to 1000 p.s.i.g. or more. The weight hourly space velocity (weight unit of total feed per weight unit of catalyst per hour) used will generally be within the range from about 0.1 to about 10. For example, in accordance with our invention isobutane or isopentane, or a mixture thereof, can be alkylated with a wide variety of monoolefin hydrocarbons, such as ethylene, propylene, a butene, a pentene, butene dimers, and so forth. Also, benzene or toluene, or a mixture thereof, can be alkylated with ethylene, propylene, propylene dimer, propylene trimer, propylene tetramer, and so forth.

The following examples illustrate our invention.

*Example I*

An alumina base was prepared according to the method employed in Example II of application Serial No. 498,084. After washing of the alumina gel, 0.11 weight percent chloride was found, based upon $Al_2O_3$. The washed hydrate was aged for 12 days at 90° F. and was then found to have a hydrate distribution as follows: boehmite, 21 percent; bayerite, 39 percent; randomite, 27 percent; and gibbsite, 10 percent (total trihydrate, 76 percent). The alumina gel was drum-dried, extruded through $\frac{1}{16}$ inch holes, and calcined by heating in flowing air at a top temperature of 480° C. The calcined alumina pellets were designated as I–XP–2 and had an area (BET method) of approximately 500 square meters per gram.

A portion of alumina pellets I–XP–2 was treated with boric acid to produce catalyst. Thus, 416 grams of I–XP–2 (analyzing 400 grams $Al_2O_3$) was placed in an evaporating dish. 98 grams of $H_3BO_3$ was dissolved in 416 ml. of distilled water at 90° C. and poured over the pellets, just wetting them. The mixture was dried at 90° C., and then calcined for 2 hours in a muffle furnace at a temperature of about 570° C. The calcined catalyst contained 12.1 percent by weight of boria ($B_2O_3$) and 2 percent by weight of volatiles.

The boria-alumina catalyst prepared as just described was employed for the alkylation of benzene with ethylene. Thus, 5 grams of the catalyst was placed in a bomb with 100 ml. of benzene and 24 grams of ethylene and the mixture was then heated for 18 hours at 200° C. The liquid product of reaction thus produced consisted of a mixture of ethyl benzene and unreacted benzene.

*Example II*

Using I–XP–2 and the general impregnation procedure described in Example I, a catalyst was prepared containing 9.0 weight percent boria and this catalyst was used to alkylate isobutane with propylene. Thus, a feed mixture composed of 7.0 weight percent of propylene and 93.0 weight percent of isobutane was passed into contact with a mass of the catalyst under the following reaction conditions: weight hourly space velocity, one; pressure, 750 p.s.i.g.; and temperature, 150° C. The liquid yield based on the propylene in the feed was 127 weight percent, and the product contained approximately 75 percent by weight of saturates.

A similar run at 120° C. gave a liquid yield based on propylene of 118 weight percent with slightly lower selectivity. The combined liquid product from the two experiments had a research octane No. clear of 96.

Example III

Using I-XP-2 and the general procedure described in Example I, a catalyst was prepared containing 4.2 weight percent boria and this catalyst was used to alkylate isobutane with propylene. Thus, a feed mixture containing 7.0 weight percent of propylene and 93.0 weight percent of isobutane was passed into contact with a mass of the catalyst under the following conditions: weight hourly space velocity, one; temperature, 150° C.; and pressure, 750 p.s.i.g. The liquid yield based upon the propylene in the feed was 125 percent by weight.

A comparison run was made employing 1/8 inch commercial alumina pellets containing about 0.5 weight percent $Na_2O$, 0.015 weight percent $SiO_2$ and 0.01 weight percent iron. These pellets were prepared from a gibbsite precursor and had a surface area of about 150 square meters per gram (BET method). The alumina had been calcined to the gamma form at a temperature of around 1200° F. About 100 grams of the pellets were immersed for 5 minutes in a 19 weight percent boric acid solution at 85° C. The pellets were then drained of excess solution and dried. They were then calcined in a muffle furnace for 2 hours at about 565° C. The catalyst was then contacted with a feed composed of 7.0 weight percent propylene and 93.0 weight percent isobutane at 0.5 weight hourly space velocity and 750 p.s.i.g. No liquid product was found either at 150° C. or 200° C.

Example IV

This example illustrates the preparation of another catalyst which can be employed in accordance with the alkylation method of our invention.

198 grams of I-XP-2 alumina pellets were placed in a one-liter, 3-necked flask and were then evacuated for a period of about 15 minutes. 35.7 grams of ethyl orthosilicate were mixed with 50 ml. of denatured alcohol, and 5 ml. of a one weight percent hydrochloric acid solution was mixed with 35 ml. of distilled water. While maintaining vacuum on the flask, the ethyl orthosilicate-alcohol solution was then added slowly from the burette, the flask also being shaken vigorously during this addition. The hydrochloric acid solution was then added to the flask through a burette with vigorous shaking. After this had been done, the vacuum was broken and the mixture was permitted to stand for 5 hours, after which it was dried overnight at 110° C. and then calcined for 3 hours at 500° C.

W claim:

1. A method for the alkylation of an alkylatable hydrocarbon with a monoolefin hydrocarbon which comprises passing a mixture of said alkylatable hydrocarbon and said monoolefin hydrocarbon under alkylating conditions into contact with a solid catalyst which consists essentially of at least one refractory metal oxide other than aluminum oxide supported on a base which essentially comprises calcined alumina which is characterized by large pore, high area structure essentially composed of gamma alumina modifications resulting from the drying and calcination of a mixture of precursor hydrous alumina phases containing at least about 65 percent of trihydrate, said base after calcining and before using having an area (BET method) of from about 350 to about 550 square meters per gram, said alkylatable hydrocarbon being selected from the group consisting of aromatic hydrocarbons and isoparaffins.

2. The method of claim 1 wherein said monoolefin hydrocarbon is a butene.
3. The method of claim 1 wherein said monoolefin hydrocarbon is ethylene.
4. The method of claim 1 wherein said alkylatable hydrocarbon is isobutane.
5. The method of claim 1 wherein said alkylatable hydrocarbon is benzene.
6. The method of claim 1 wherein said refractory oxide is boria.
7. The method of claim 1 wherein said refractory oxide is silica.
8. The method of claim 1 wherein said monoolefin hydrocarbon is a butene, wherein said alkylatable hydrocarbon is isobutane and wherein said refractory oxide is boria.
9. The method of claim 1 wherein said monoolefin hydrocarbon is a butene, wherein said alkylatable hydrocarbon is isobutane and wherein said refractory oxide is silica.
10. The method of claim 1 wherein said monoolefin hydrocarbon is ethylene, wherein said alkylatable hydrocarbon is benzene and wherein said refractory oxide is boria.
11. The method of claim 1 wherein said monoolefin hydrocarbon is ethylene, wherein said alkylatable hydrocarbon is benzene and wherein said refractory oxide is silica.
12. The method of claim 1 wherein said monoolefin hydrocarbon is propylene.
13. The method of claim 1 wherein said monoolefin hydrocarbon is propylene, wherein said alkylatable hydrocarbon is isobutane and wherein said refractory oxide is boria.
14. The method of claim 1 wherein said solid catalyst contains from one to about 20 percent by weight of at least one refractory metal oxide other than aluminum oxide.

References Cited in the file of this patent

UNITED STATES PATENTS

| | | |
|---|---|---|
| 2,418,028 | Haensel | Mar. 25, 1947 |
| 2,542,190 | Gorin | Feb. 20, 1951 |
| 2,820,835 | Peters et al. | Jan. 21, 1958 |
| 2,836,633 | Esmay et al. | May 27, 1958 |
| 2,838,375 | Teter et al. | June 10, 1958 |